United States Patent
Baker et al.

(10) Patent No.: US 7,261,263 B2
(45) Date of Patent: Aug. 28, 2007

(54) ARTICLE SUPPORT SYSTEM FOR POLES

(75) Inventors: Lester J. Baker, Berthoud, CO (US); Chuck DeWitt, Conifer, CO (US)

(73) Assignee: Brass Smith, LLC, Denver, CO (US)

( * ) Notice: Subject to any disclaimer, the term of this patent is extended or adjusted under 35 U.S.C. 154(b) by 215 days.

(21) Appl. No.: 10/930,334

(22) Filed: Aug. 30, 2004

(65) Prior Publication Data
US 2006/0043245 A1    Mar. 2, 2006

(51) Int. Cl.
    *E04G 3/00* (2006.01)
(52) U.S. Cl. ............................. 248/218.4; 248/229.1; 248/316.1; 24/24; 24/273
(58) Field of Classification Search ............ 248/218.4, 248/316.1, 227.3, 229.1, 229.11, 229.2, 229.21, 248/228.2, 230.2, 231.31; 24/270, 273, 24, 24/21; 220/321; 229/256.69; 285/252, 285/256, 373, 409
See application file for complete search history.

(56) References Cited

U.S. PATENT DOCUMENTS

| | | | | |
|---|---|---|---|---|
| 596,689 A * | 1/1898 | Aungst | ........................ | 248/75 |
| 903,593 A * | 11/1908 | Lowendahl | ................ | 211/110 |
| 953,156 A * | 3/1910 | Rasmussen | ................ | 132/66.1 |
| 964,840 A * | 7/1910 | Bernau | ........................ | 431/295 |
| 1,342,626 A * | 6/1920 | Frank | ........................ | 211/107 |
| 1,441,913 A * | 1/1923 | Darling | ........................ | 211/107 |
| 1,507,094 A * | 9/1924 | Schoenborn | ............ | 248/277.1 |
| 1,628,623 A * | 5/1927 | Jonnes | ........................ | 211/107 |
| 2,289,422 A * | 7/1942 | Grotnes | ........................ | 24/273 |
| 2,331,132 A * | 10/1943 | Nadelson | ..................... | 24/271 |
| 2,360,482 A * | 10/1944 | Evans | .............................. | 2/8.1 |
| 2,741,497 A * | 4/1956 | Risley | ......................... | 285/342 |
| 3,113,791 A * | 12/1963 | Frost et al. | ................. | 285/112 |
| 3,212,743 A * | 10/1965 | Culver | ........................ | 248/313 |
| 3,828,403 A * | 8/1974 | Perrin et al. | .................. | 24/270 |
| 4,286,897 A * | 9/1981 | Suskind | ...................... | 405/221 |
| 4,801,115 A * | 1/1989 | Heard | ..................... | 248/219.3 |
| 4,860,909 A * | 8/1989 | Leumi | ......................... | 220/475 |
| 4,953,819 A * | 9/1990 | Davis | ...................... | 248/227.3 |
| 5,359,866 A * | 11/1994 | Boddy | ............................ | 70/18 |
| 5,427,344 A * | 6/1995 | Beauchemin | ............ | 248/218.4 |
| 5,509,180 A | 4/1996 | Benetti et al. | | |
| 5,634,619 A | 6/1997 | Alessi | | |
| 5,782,743 A * | 7/1998 | Russell | .......................... | 600/9 |
| 5,819,378 A | 10/1998 | Doyle | | |
| 6,061,939 A | 5/2000 | Gildea | | |
| 6,293,035 B1 | 9/2001 | LaPointe | | |
| 6,523,230 B1 * | 2/2003 | Weinhold | ..................... | 24/273 |
| 6,601,328 B1 | 8/2003 | Benaquista et al. | | |
| 6,631,876 B1 * | 10/2003 | Phillips | ..................... | 248/74.2 |

* cited by examiner

*Primary Examiner*—Korie Chan
(74) *Attorney, Agent, or Firm*—Townsend and Townsend and Crew LLP

(57) ABSTRACT

A device to support one or more articles with a pole, where the device may include a collar having a first section and a second section that are coupled by a hinge to allow the collar to open. The collar may be openable at opposite facing ends of the first and second sections to receive the pole, and closeable around the received pole. The device may also include a clasp to lock the collar in a closed position on the pole. The clasp may include a fastening hook and a tensioning member coupled by a clasp pin. The fastening hook has a hooked end that can be received by a lip on the first section of the collar and held on the lip by articulating the tensioning member to the closed position.

26 Claims, 9 Drawing Sheets

ARTICLE SUPPORT SYSTEM FOR POLES

FIELD OF THE INVENTION

The present invention relates to methods and devices for supporting articles on poles. Specifically, the invention relates to methods and devices that include the attachment of an article support to the pole with a collar that can be clasped to the pole.

BACKGROUND OF THE INVENTION

Displays for goods and services play an important role in attracting buyers and making sales. They may be found in almost every place where commerce may be conducted, including retail stores and malls, supermarkets, restaurants, food courts, dining halls, hotels, craft and trade shows, event stadiums, and museums, among many other settings. In many instances, displays of articles have to be constructed quickly, and should be rapidly flexible to allow fast and easy changes. For example, elaborate displays for a trade shows often need to be set up in a matter of minutes to hours, and may need to be disassembled just as quickly at the end of the show. Restaurant displays of meal and beverage specials may change between breakfast, lunch and dinner periods, requiring fast changes three times a day or more.

One display framework that has proven to be efficient and versatile in a wide variety of public spaces and commercial environments is the post supported article display. These displays typically include plastic, wood or metal tubes or poles that can be assembled into a framework for supporting articles at a variety of heights and angles. The frameworks can be a simple as a single pole placed in the ground, to large, elaborate scaffolding assembled from hundreds or even thousands of interconnected poles.

The articles themselves are supported from the post framework by article support members attached to the poles. For example, the support members may include an internal screw thread that can be screwed onto an end of an externally threaded pole to attach the support member to the pole. There are problems with this means of attachment, such as stripping or otherwise damaging the threads on the poles and/or support members, which prevents the support member from being properly positioned on the pole.

Another conventional way for attaching an article support member to a pole includes sliding the member onto an end of a non-threaded pole, and clamping the member into place by, for example, tightening a set screw on the member against the pole. Problems with this attachment method include the requirement that at least one end of the pole be free for the member to slide over. In addition, the fastener (e.g., the set screw) is prone to overtightening, which can dent the pole and/or strip the fastener.

Sill another way to attach an article support member to a pole uses a hinged bracket that can be clamped around the pole with bolts and screws. While this method does not require that at least one end of the pole be free to accept the support member, problems such as the overtightening, stripping or loss of the threaded bolt or screw used to clamp the bracket still persist. Thus there remains a need for new devices to support articles on display frameworks (e.g., threaded and non-threaded poles) that address these and other problems with conventional article support members.

BRIEF SUMMARY OF THE INVENTION

Embodiments of the invention include a device to support one or more articles with a pole. The device may include a collar having a first section and a second section that are coupled by a hinge to allow the collar to open. The collar may be openable at opposite facing ends of the first and second sections to receive the pole, and closeable around the received pole. The device may also include a clasp to lock the collar in a closed position on the pole. The clasp may include a fastening hook and a tensioning member coupled by a clasp pin. The fastening hook has a hooked end that can be received by a lip on the first section of the collar and held on the lip by articulating the tensioning member to the closed position.

Embodiments of the invention also include a support device for an article. The device may include a collar having a first section and a second section that are coupled by a hinge to allow the collar to open. The collar is openable at opposite facing ends of the first and second sections to receive a pole, and closeable around the received pole. The device may also include a clasp to lock the collar in a closed position on the pole. The clasp may include a fastening hook and a tensioning member coupled by a clasp pin, where the fastening hook has a hooked end that can be received by a lip on the first section of the collar and held on the lip by articulating the tensioning member to the closed position. The device may further include an article support member to support the article around the pole. The support member may include a collar attachment section to attach the support member to the collar, and an article support section to support the article. The collar attachment section may additional include a bracket having a first tooth, and a second tooth opposite the first tooth. The first and second teeth may slideably engage a peripheral lip on the collar to attach the article support member to the collar.

Embodiments of the invention further include a cylindrical collar for supporting one or more articles with a support pole. The collar may include a collar ring divided into two halves, where the halves are coupled by a hinge to allow the halves of the collar ring to open and close. The collar ring can be opened to receive a pole and close around the received pole. The collar may also include a clasp to lock the collar ring in a closed position on the pole. The clasp may include a fastening hook that can be received by a lip on the collar ring and a tensioning member that causes the fastening hook and the lip to forcibly engage each other when the tensioning member is articulated into a locked position. The fastening hook and the tensioning member may be curved to be flush with an outer diameter surface of the cylindrical collar in the locked position.

Embodiments of the invention also include a support device for a plurality of articles. The device may include a collar having a first section and a second section that are coupled by a hinge to allow the collar to open. The collar may be openable at opposite facing ends of the first and second sections to receive a pole, and closeable around the received pole. The device may also include a clasp to lock the collar in a closed position on the pole. The clasp may include a fastening hook and a tensioning member coupled by a clasp pin, where the fastening hook has a hooked end that can be received by a lip on the first section of the collar and held on the lip by articulating the tensioning member to the closed position. The device may also include three or more article support members to support the articles around the pole. The three or more support members may include collar attachment sections to attach the support members to the collar, and article support sections to support the articles. The collar attachment sections may each comprise a bracket having a first tooth, and a second tooth opposite the first tooth, were the first and second teeth may slideably engage a peripheral lip on the collar to attach the article support members to the collar.

Embodiments of the invention still further include a method of supporting an article with a pole. The method may include the step of fixing a collar around the pole, where the collar has a first section and a second section coupled by a hinge that allows the collar to open and receive the pole, and a clasp for fixedly attaching the collar around the pole. The method may also include the step of attaching an article support member to the collar, where the support member includes a collar attachment section for attaching the support member to the collar, and an article support section for supporting the article.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

The present invention includes methods and devices to support articles on a display framework constructed of poles, posts, etc. The devices may include a hinged collar openable into two or more sections to receive the pole, and closeable around the received pole. The collar may further include a clasp that can lock the collar in a fixed position on the pole. An article support member may be attached to the clasped collar to support an article (e.g., bottles, glasses, silverware, plates, bowls, napkin holders, floral arrangements, signs, product displays, etc.) on the pole framework.

Exemplary Collar

Figure 1A:
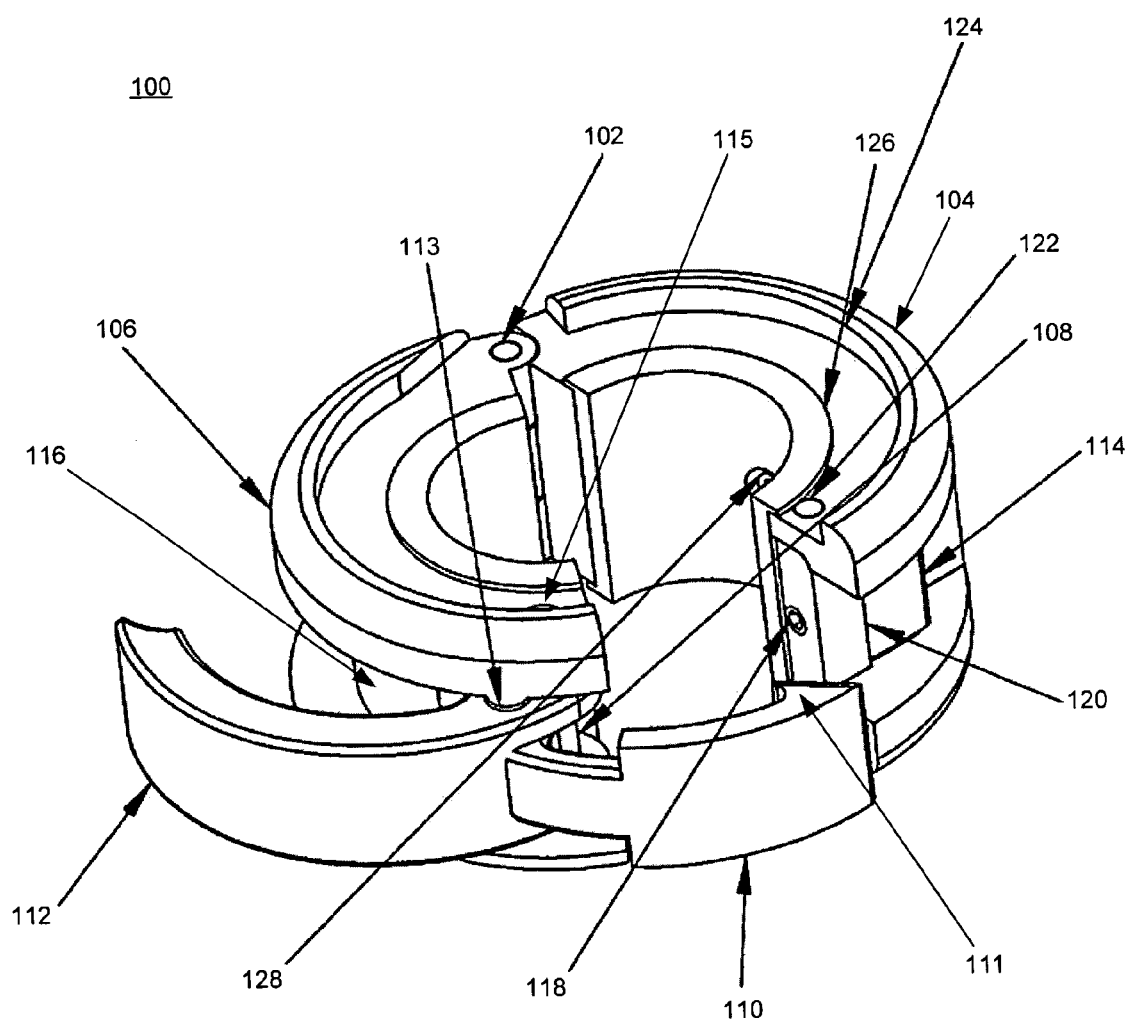
FIG. 1A shows a collar for a support device according to embodiments of the invention.

FIG. 1A shows a collar 100 for a support device according to embodiments of the invention. The collar 100 includes a hinge 102 that allows a first section 104 and second section 106 of the collar 100 to open and close. The collar 100 also includes a clasp 108 to lock the collar 100 in a fixed position around a pole (not shown). The clasp 108 may include a fastening hook 110 and a tensioning member 112 coupled together by a clasp pin 113, and a collar pin 115 that couples the clasp 108 to the collar 100. The fastening hook 110 has a hook end 111 that can be received by a lip 114 on first section 104 of the collar 110. The collar may be locked when the hook end 111 is moved in position over the lip 114 and the tensioning member 112 is articulated into a closed position by moving the member 112 into the gap 116 in the outer diameter of the second section 106 of the collar 100.

The tension between the first and second sections 104, 106 when the collar 100 is locked may be adjusted by changing the position of 114. In the embodiment illustrated, the lip 114 may be adjusted by changing the position of a set screw 118 in lip support 120. The lip support 120 may be held in place by support pins 122, proximate to the end of first section 104. The set screw 118 may be rotatably articulated through the threaded opening in fixed support 120, causing the lip 114 to move closer to (or away from) the support 120. As the lip 114 is pushed further away from support 120, the tension increases between the first and second sections 104, 106 when the clasp 108 is locked.

A peripheral lip 124 may extend around a substantial portion of the first and second sections 104, 106 of the collar 100. The peripheral lip 124 may be discontinuous, having one or more breaks that allow teeth on an article attachment piece of an article support member (not shown) to slide behind the peripheral lip 124 to attach the support member to the collar 100. In other embodiments (not shown), the peripheral lip 124 may not be present and the article support member is attaching to the collar 100 by another means (e.g., clamping the support member directly to the sidewalls of the first or second section 104, 106).

Collar 100 may be made from a variety of materials, including metals and plastics. For example, collar 100 may be made from aluminum, titanium, iron, stainless steel, alloys of two or more metals, etc. When the collar 100 is made from a hard material (e.g., stainless steel) the inner diameter surface of collar 100 may be covered by an inner collar sleeve 126 to increase the friction between the collar and pole, and also to protect the pole surface (e.g., threads on the pole surface) when the collar 100 is locked around the pole. The collar sleeve 126 may be formed into sections that conform to the inner diameter surfaces of the first and second section 104, 106 of the collar 100, and each section may be attached to the collar 100 by a fastener 128 (e.g., a screw, rivet, etc.). The collar sleeve 126 may be made from plastic or rubber.

Figure 1B:
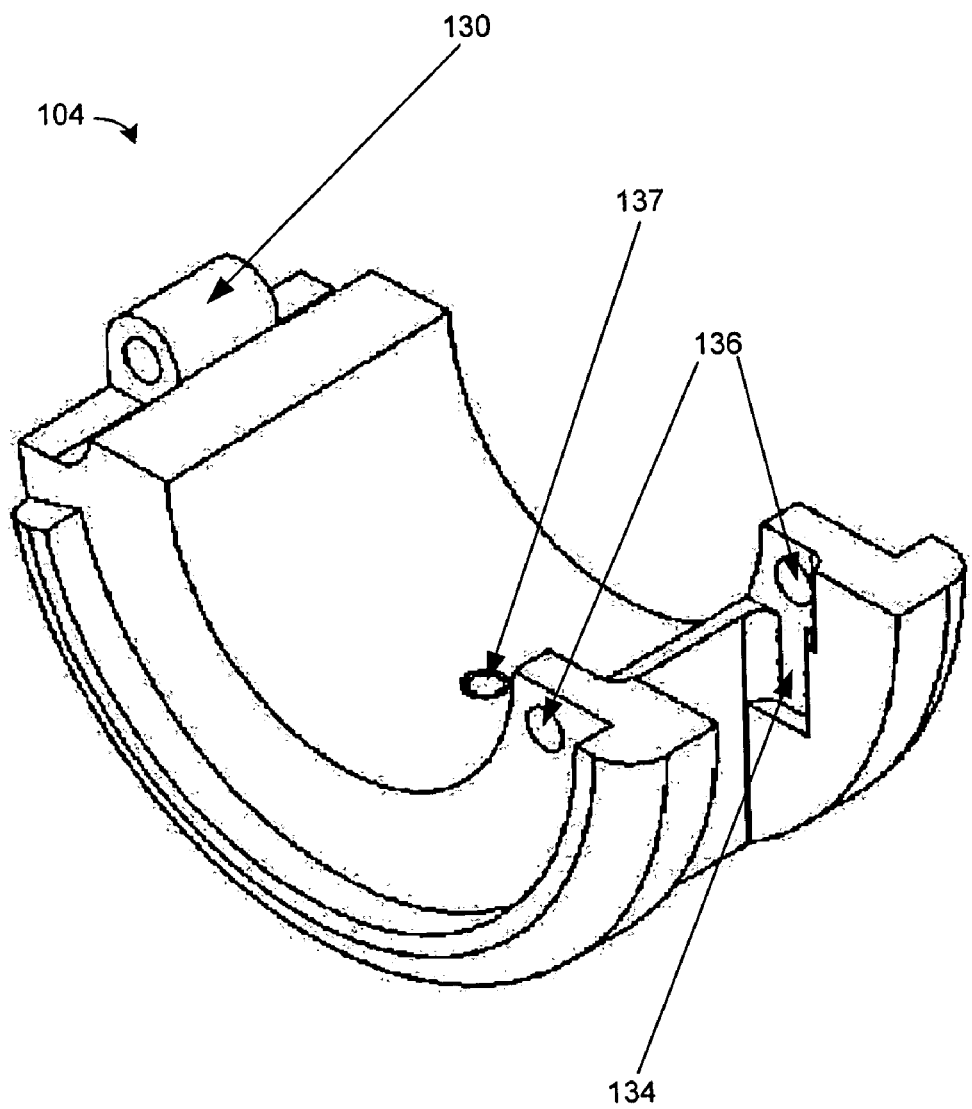
FIGS. 1B and 1C show sections of a collar according to embodiments of the invention.
Figure 1C:
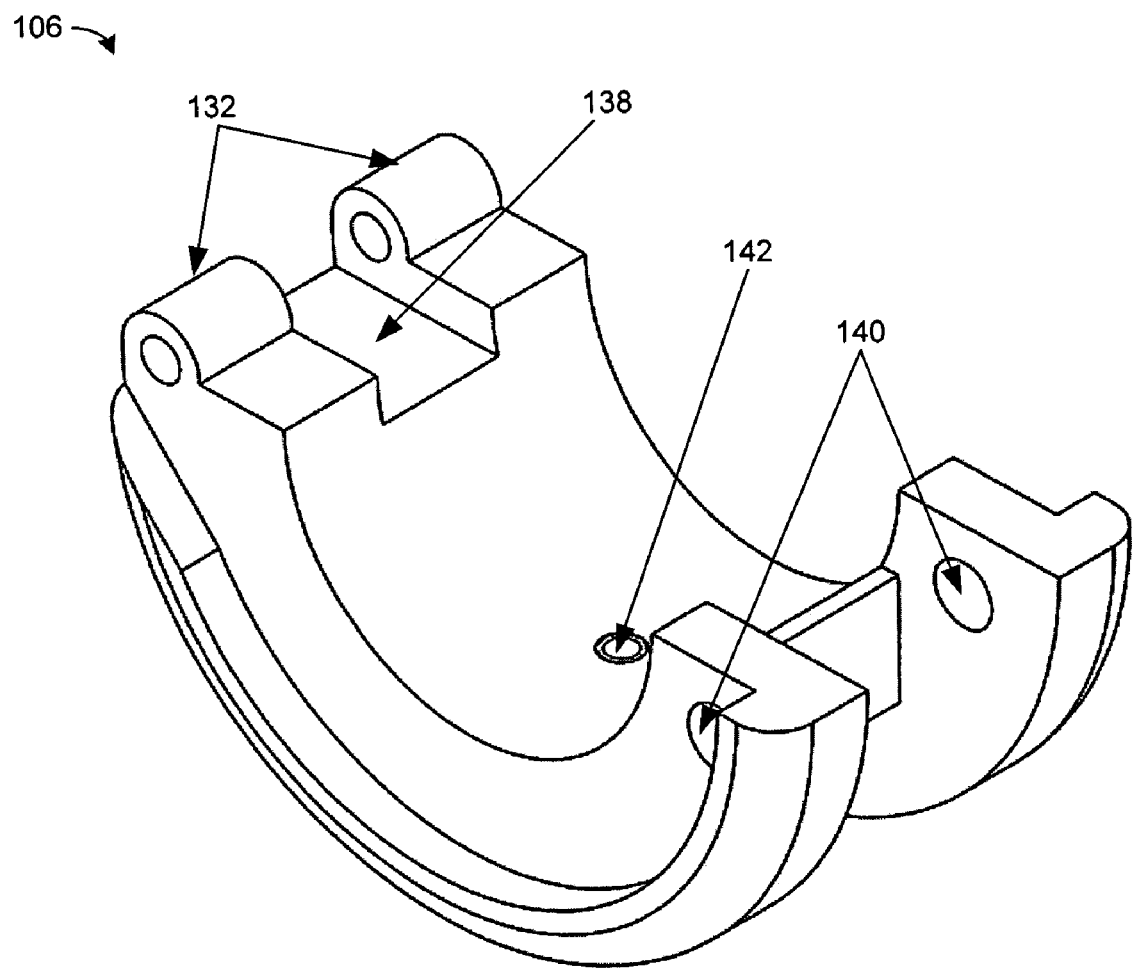

Referring now to FIG. 1B, another perspective of the first section 104 of collar 100 is shown. FIG. 1B shows hinge element 130 that may be coupled with a hinge pin (not shown) to hinge elements 132 of second section 106 in FIG. 1C to form hinge 102. Also shown is one side of groove 134 into which the lip 114 and lip support 120 are inserted. Openings 136 may also be formed in grove 134 for support pins 122 that couple the lip support 120 to the first section 104. Additionally, opening 137 may be formed on the inner diameter surface of section 104 to accept a fastener (not shown) that couples the section 104 to a section of an inner collar sleeve (not shown in FIG. 1B).

As noted above, FIG. 1C shows second section 106, which may include hinge elements 132 that can be coupled to hinge element 130 to form the hinge 102. Gap 138 is formed in the second section 106 to accommodate hinge element 130 from the first section 104. Also shown are openings 140 for collar pin 115 that couples the clasp 108 to the collar 100. Additionally, opening 142 may be formed on the inner diameter surface of section 106 to accept a fastener (not shown) that couples the section 106 to a section of an inner collar sleeve (not shown in FIG. 1C).

Figure 1D:
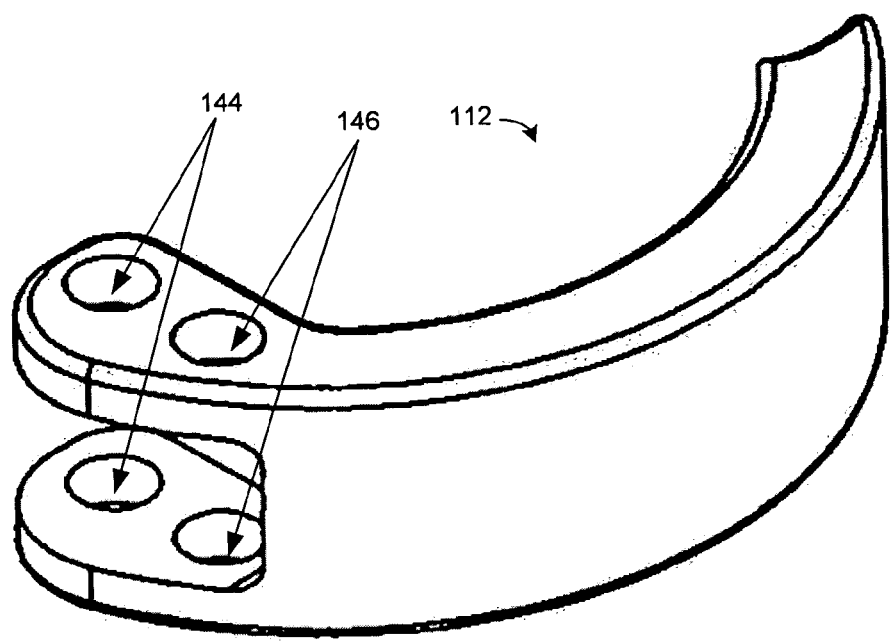
FIG. 1D shows a tensioning member of a clasp according to embodiments of the invention.
Figure 1E:
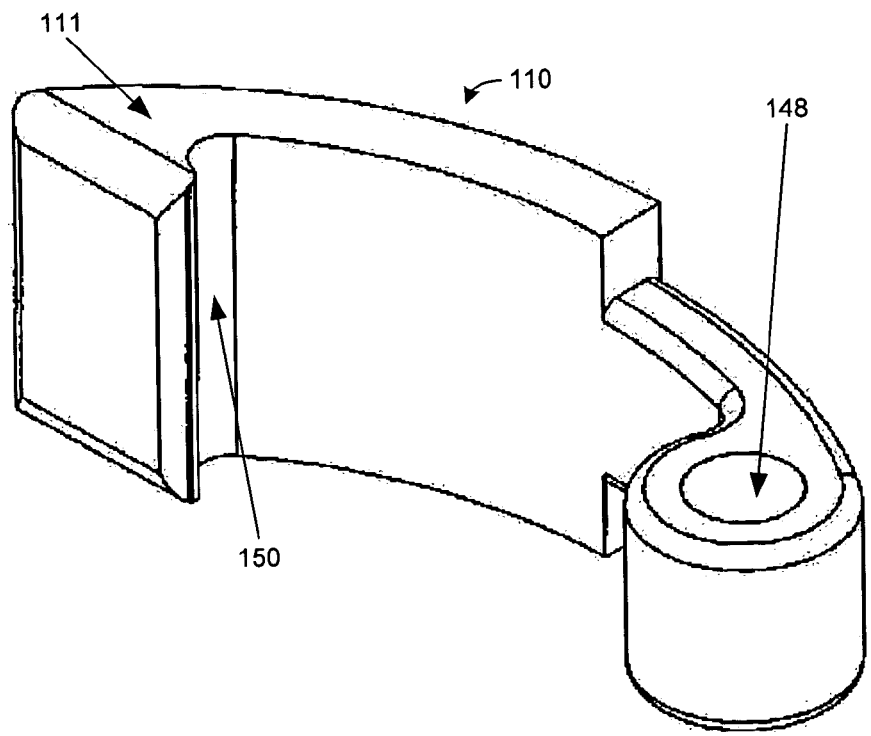
FIG. 1E shows a fastening hook of a clasp according to embodiments of the invention.

FIGS. 1D and 1E show the tensioning member 112 and fastening hook 110, respectively, of clasp 108. The tensioning member 112 includes opening 144 for accepting the collar pin 115 (not shown in FIG. 1D) that couples the tensioning member 112 to the collar 100. The tensioning member also includes opening 146 which is aligned with opening 148 in the fastening hook 110 for accepting the clasp pin 113 (not shown in FIGS. 1D and 1E). Fastening hook 110 may also include hook end 111 whose inner hook surface 150 may be made substantially conformal with the upper portion of lip 114 for a secure engagement of the lip with the fastening hook 110 when collar 110 is locked.

Figure 1F:
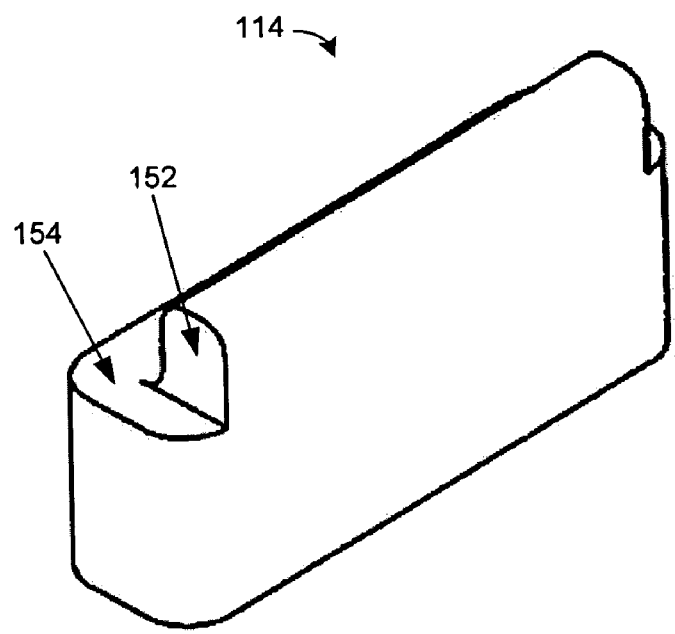
FIGS. 1F and G show the hook lip and lip tension level adjuster of the collar according to embodiments of the invention.
Figure 1G:
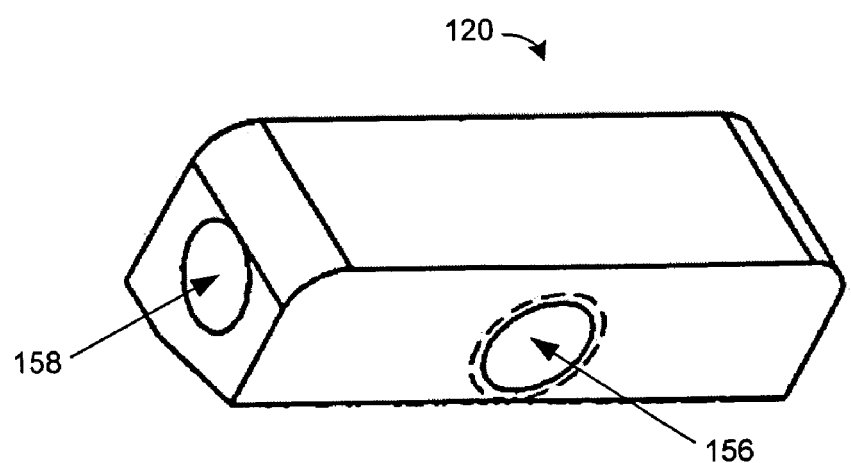

FIG. 1F and 1G show additional views of the lip 114 and lip support 120, respectively. Lip 114 includes an upper lip portion 152 that engages the inner hook surface 150 when the collar 100 is locked, and lower lip portion 154 that contacts the set screw 118 and/or lip support 120. Lip support 120 includes a threaded opening 156 for the set screw 118 that is used to adjust the position of lip 114, which adjusts the locking tension in locked collar 100. Lip support 120 may also include an oppositely facing pair of openings 158 to receive support pins 122 that couple the support 120 to the collar 100.

Exemplary Article Support Member

Figure 2:
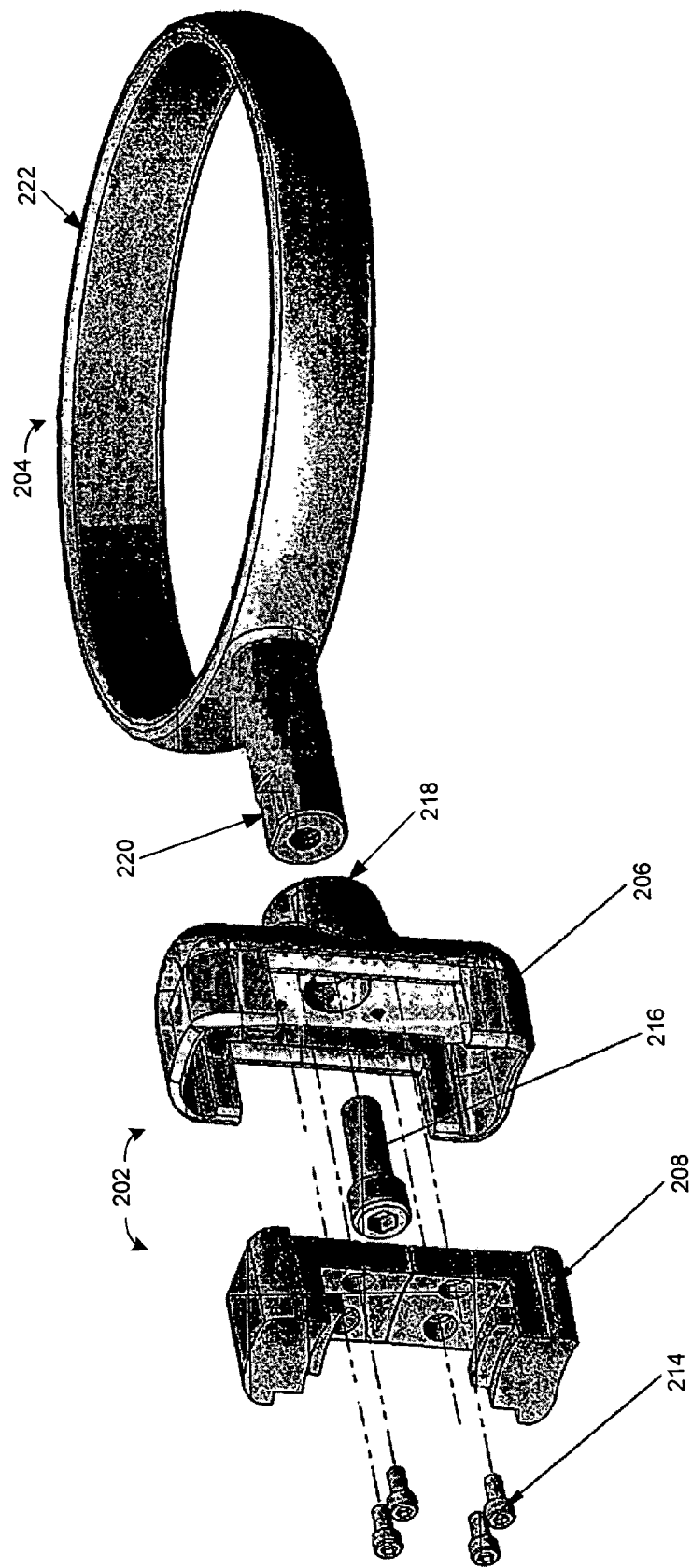
FIG. 2 shows an article support member that can attach to a collar according to embodiments of the invention.

Referring now to FIG. 2, an article support member 200 according to embodiments of the invention is shown. The member 200 includes a collar attachment section 202 for attaching the member 200 to a collar (not shown), and an article support section 204 for supporting the article to be displayed (not shown). The collar attachment section 202 may include a support section receiving element 206 that can attach to the article support section 204, and a bracket 208 that may attach directly to the collar.

The bracket 208 may include oppositely facing first and second teeth 210, 212 that can slide behind a peripheral lip on the collar (such as peripheral lip 124 of collar 100 in FIG. 1A) to attach the bracket 208 to the collar. In other embodiments (not shown) bracket 208 may be replaced by a clamp that can be reversibly tightened around the collar, or a shaft (e.g., a threaded shaft) that may be received by an opening (e.g., a threaded opening) in the collar. In still other embodiments (not shown), the collar and article support member 200 may form a single, permanently attached article that can be secured around a pole of the display framework.

In the embodiment shown, the bracket 208 may be coupled to receiving element 206 by fasteners (e.g., a set of four screws 214). The receiving element 206 may also be attached to the support section 204 by a fastener (e.g., screw 216). The receiving element 206 may include an opening 218 that can receive a post section 220 of the article support member 204. The post section 220 may include a flat side that may be aligned with a flat side in the opening 218 to prevent the post section 220 from rotating in the opening 218. In other embodiments (not shown) the post section 220 may be secured by tension in opening 218, instead of using a fastener like screw 216.

Figure 4:
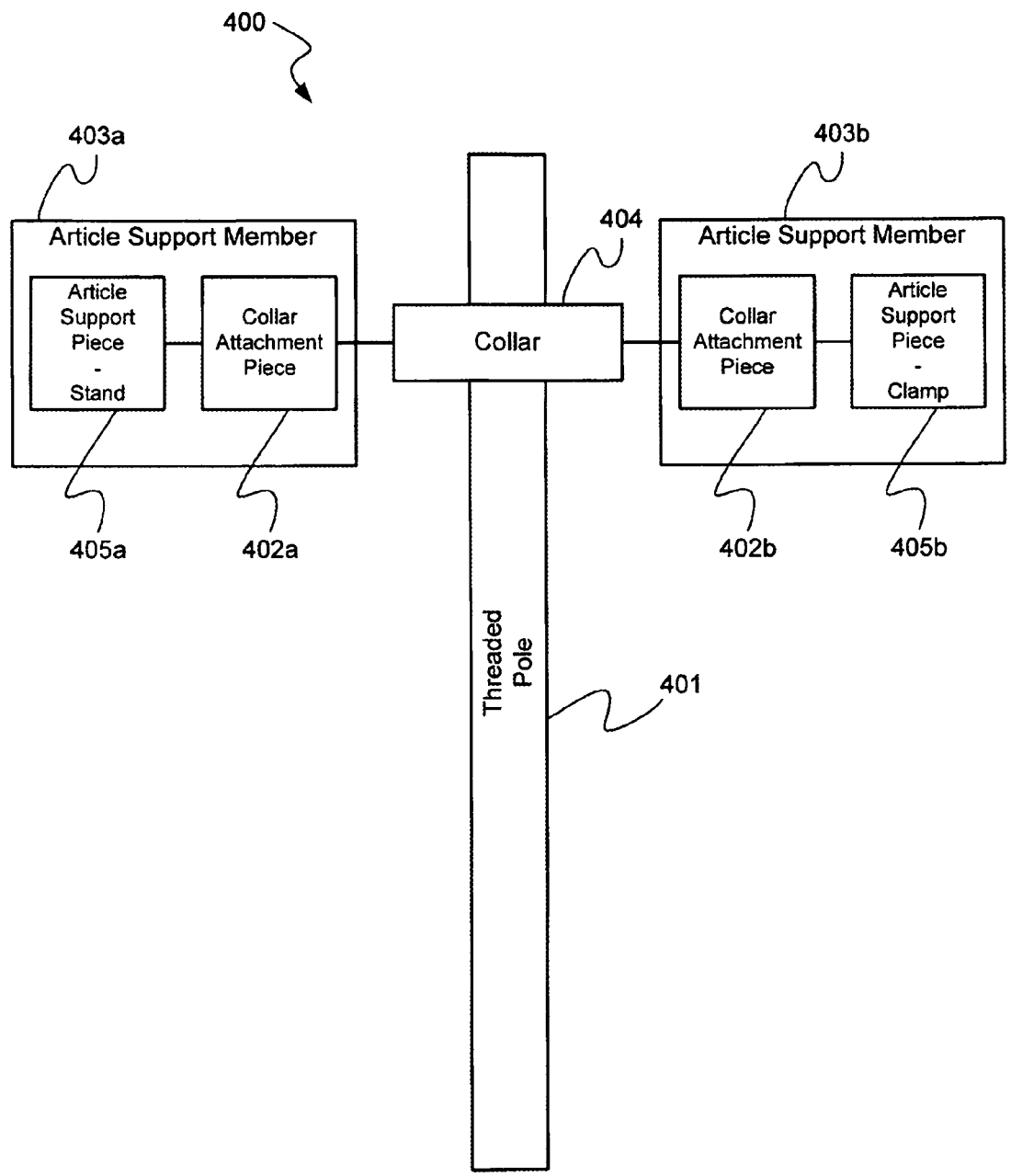
FIG. 4 shows a block diagram of an article support member attached to a collar clamped to a threaded pole according to embodiments of the invention.
Figure 5:
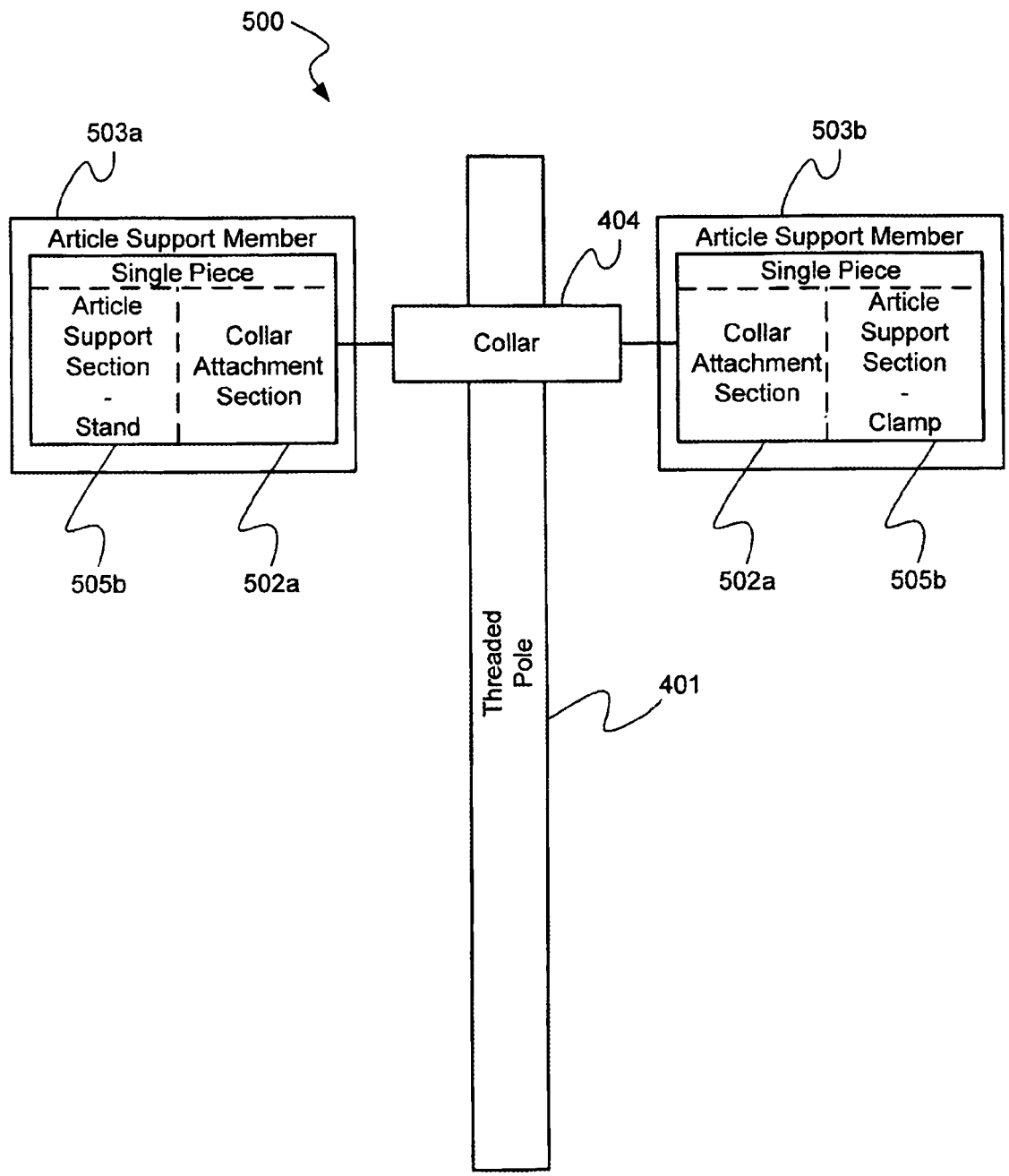
FIG. 5 shows a block diagram of a block diagram of an article support member attached to a collar clamped to a threaded pole according to embodiments of the invention.

The article support member 204 shown in FIG. 2 includes a circular platform 222 for supporting the article (or articles) to be displayed. FIG. 4 and FIG. 5 show additional embodiments 400, 500. In FIG. 4, the article support member 403a-b may include one or more clamps, clips, containers, and platform shapes (e.g., circular, elliptical, square 408, rectangular, polygonal, etc.) to display the article. The article support piece 405a-b attach to collar 404 via a collar attachment piece 402a-b. In the embodiment shown, the collar 404 is attached to a threaded pole 401. In FIG. 5. the article support members 503a-b include article support sections 505a-b which attach to collar 404 via collar attachment sections 502a-b.

Exemplary Method of Supporting An Article

Figure 3:
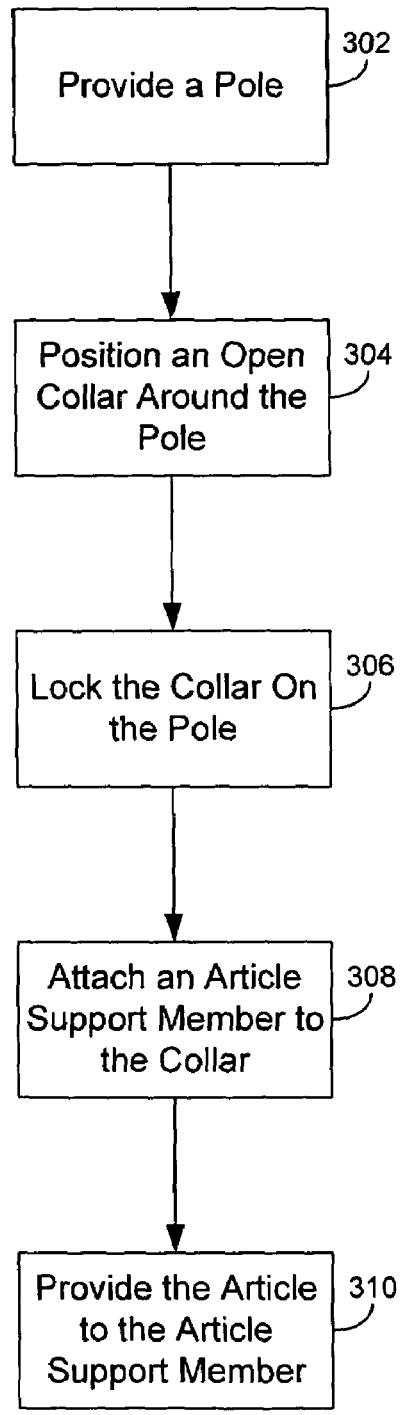
FIG. 3 shows a flowchart of a method of supporting an article according to embodiments of the invention.

FIG. 3 shows a flowchart of methods of supporting an article 300 according to embodiments of the invention. These methods may be used to present articles in virtually any commercial setting, such as retail stores and malls, supermarkets, restaurants, food courts, dining halls, hotels, craft and trade shows, event stadiums, and museums, among many other settings.

The method 300 includes providing a pole that is part of a display framework in step 302. The pole may constitute the entire display framework (e.g., a pole having an end placed in the ground) or the pole may be part of a more elaborate display framework that may include a plurality of interconnected poles. The pole may be substantially perpendicular to the ground, substantially parallel with the ground, or at some orientation between perpendicular and parallel to the ground.

A hinged collar may be placed around the pole at a position selected for the display of the article (or articles) at step 304. For example, the collar used in a product display may be positioned at the average eye level for an adult, while collars used in a toy display may be placed at the average eye level for a child. If the display is being used to support dishes, silverware, beverages, etc. at a food court or restaurant (e.g., a salad bar), the collar may be positioned at waist level for patrons to easily reach the articles. If the display is being used to support an advertising banner, room light, etc., the collar may be positioned on the pole several feet (e.g., about 7 or more feet) above the ground.

After the collar is properly positioned, it may be locked in position on the pole in step 306. In some embodiments, the collar is locked around the pole using a clasp like the one shown in FIG. 1A above. The clasp allows the collar to be quickly locked and unlocked around the pole, facilitating the efficient set-up, break-down and repositioning of the display. Once the collar is locked in position, an article support member may be attached to the collar in step 308. As shown in FIG. 2 above, the article support member may be slidably attached to the collar. Additional article support members (not shown) may also be slidably attached to the collar (e.g., three or more article support members). In other embodiments of the method, the article support member and collar may be coupled before the collar is locked around the pole, and in still other embodiments, the collar and support member are a single unit, and the support member does not have to be attached to the collar in a separate step.

The article may be provided to the article support member at step 310. The articles may include a wide variety of articles capable of being supported by the display framework. For example, in a restaurant or food court, the articles may include bottles, glasses, silverware, plates, bowls, napkin holders, condiments, food displays, floral arrangements, and signs among other articles. In a trade show setting, the articles may include, product displays, product literature, advertising signage, logos, banners, lighting, etc.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein and in the appended claims, the singular forms "a", "and", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A device to support one or more articles with a pole, the device comprising:
    a collar having a first section and a second section that are coupled by a hinge to allow the collar to open, wherein the collar is openable at opposite facing ends of the first and second sections to receive the pole, and closable around the received pole; and
    a clasp to lock the collar in a closed position on the pole, the clasp comprising a fastening hook and a tensioning member coupled by a clasp pin, wherein the fastening hook has a hooked end that can be received by a lip on the first section of the collar and held on the lip by articulating the tensioning member to the closed position, wherein the fastening hook and the tensioning member are curved to be flush with an outer diameter of the collar in the closed position, and wherein the lip receiving the hooked end of the fastening hook is adjustable to control a tension level in the collar in the closed position, and the lip is adjusted by moving the lip with a set screw.

2. The device of claim 1, further comprising a first article support member to support the article around the pole, wherein the support member is attachable to the collar.

3. The device of claim 2, further comprising a second article support member attachable to the collar along with the first article support member.

4. The device of claim 2, further comprising three or more article support members attachable to the collar along with the first article support member.

5. The device of claim 2, wherein the first article support member comprises a collar attachment piece for attaching the support member to the collar, and an article support piece that is coupled to collar attachment piece.

6. The device of claim 5, wherein the collar attachment piece comprises a bracket having a first tooth, and a second tooth opposite the first tooth, the first and second teeth slideably engaging a peripheral lip on the collar to attach the first article support member to the collar.

7. The device of claim 5, wherein the article support piece comprises a clamp to hold the article.

8. The device of claim 5, wherein the article support piece comprises a stand upon which the article may be placed.

9. The device of claim 1, further comprising an inner liner attached to inside surfaces of the first and second sections of the collar, wherein the inner liner makes contact with the pole received by the collar.

10. The device of claim 9, wherein the inner liner comprises plastic.

11. The device of claim 1, wherein the pole is a threaded pole.

12. The device of claim 1, wherein the articles are selected from the group consisting of bottles, glasses, silverware, plates, bowls, napkin holders, floral arrangements, signs, and product displays.

13. A support device for an article, the device comprising:
    a collar having a first section and a second section that are coupled by a hinge to allow the collar to open, wherein the collar is openable at opposite facing ends of the first and second sections to receive a pole, and closeable around the received pole;
    a clasp to lock the collar in a closed position on the pole, the clasp comprising a fastening hook and a tensioning member coupled by a clasp pin, wherein the fastening hook has a hooked end that can be received by a lip on the first section of the collar and held on the lip by articulating the tensioning member to the closed position, wherein the fastening hook and the tensioning member are curved to be flush with an outer diameter of the collar in the closed position, and wherein the lip receiving the hooked end of the fastening hook is adjustable to control a tension level in the collar in the closed position, and the lip is adjusted by moving the lip with a set screw; and
    at least one article support member to support the article around the pole, wherein the support member comprises a collar attachment section to attach the support member to the collar, and an article support section to support the article, the collar attachment section comprising a bracket having a first tooth, and a second tooth opposite the first tooth, the first and second teeth slideably engaging a peripheral lip on the collar to attach the article support member to the collar.

14. The support device of claim 13, further comprising three or more of the article support members.

15. The support device of claim 13, wherein the collar attachment section is detachable from the article support section.

16. The support device of claim 13, wherein the collar attachment section and the article support section form a single piece of the article support member.

17. The support device of claim 13, wherein the article support section comprises a clamp to hold the article.

18. The support device of claim 13, wherein the article support section comprises a stand upon which the article may be placed.

19. A cylindrical collar for supporting one or more articles with a support pole, the collar comprising:
    a collar ring divided into two halves, wherein the halves are coupled by a hinge to allow the halves of the collar ring to open and close, wherein the collar ring can be opened to receive a pole and close around the received pole; and a clasp to lock the collar ring in a closed position on the pole, the clasp comprising a fastening hook that can be received by a lip on the collar ring and a tensioning member which causes the fastening hook and the lip to forcibly engage each other when the tensioning member is articulated into a locked position, wherein the fastening hook and the tensioning member are coupled by a clasp pin, wherein the fastening hook and the tensioning member are curved to be flush with an outer diameter surface of the cylindrical collar in the locked position, and wherein the lip receiving the hooked end of the fastening hook is adjustable to control a tension level in the collar in the closed position, and the lip is adjusted by moving the lip with a set screw.

20. The cylindrical collar of claim 19, wherein the collar ring comprises a peripheral lip that is flush with the outer diameter surface of the collar ring, wherein said peripheral lip can slidably engage a bracket section of one or more article support members that can support an article around the pole.

21. The cylindrical collar of claim 19, further comprising an inner liner attached to inside surfaces of the collar ring, wherein the inner liner makes contact with the pole received by the collar ring.

22. The cylindrical collar of claim 21, wherein the inner liner comprises plastic.

23. A support device for a plurality of articles, the device comprising:

a collar having a first section and a second section that are coupled by a hinge to allow the collar to open, wherein the collar is openable at opposite facing ends of the first and second sections to receive a pole, and closeable around the received pole;

a clasp to lock the collar in a closed position on the pole, the clasp comprising a fastening hook and a tensioning member coupled by a clasp pin, wherein the fastening hook has a hooked end that can be received by a lip on the first section of the collar and held on the lip by articulating the tensioning member to the closed position, wherein the fastening hook and the tensioning member are curved to be flush with an outer diameter of the collar in the closed position, and wherein the lip receiving the hooked end of the fastening hook is adjustable to control a tension level in the collar in the closed position, and the lip is adjusted by moving the lip with a set screw; and three or more article support members to support the articles around the pole, wherein the support members comprise collar attachment sections to attach the support members to the collar, and article support sections to support the articles, the collar attachment sections each comprising a bracket having a first tooth, and a second tooth opposite the first tooth, the first and second teeth slideably engaging a peripheral lip on the collar to attach the article support members to the collar.

24. A method of supporting an article with a pole, the method comprising the steps of:

positioning a collar around the pole, wherein the collar has a first section and a second section coupled by a hinge that allows the collar to open and receive the pole;

clasping the collar around the pole with a fastening hook and a tensioning member coupled by a clasp pin, wherein the fastening hook has a hooked end that can be received by a lip on the first section of the collar and held on the lip by articulating the tensioning member to a closed position, wherein the fastening hook and the tensioning member are curved to be flush with an outer diameter of the collar in the closed position, and wherein the lip receiving the hooked end of the fastening hook is adjustable to control a tension level in the collar in the closed position, and the lip is adjusted by moving the lip with a set screw; and attaching at least one article support member to the collar, wherein the support member comprises a collar attachment section for attaching the support member to the collar, and an article support section for supporting the article.

25. The method of claim 24, wherein the method further comprises adjusting the hooked end of the fastening hook to control a tension level in the collar in the closed position.

26. The method of claim 24, wherein the step of attaching of the article support member to the collar comprises sliding a first tooth and a second tooth on a bracket end of the support member behind a peripheral lip formed on the collar, wherein the first and second tooth are formed opposite each other on the bracket.

* * * * *